J. M. ROE.
ELECTRICALLY HEATED RECEPTACLE.
APPLICATION FILED JULY 17, 1912.

1,046,859.

Patented Dec. 10, 1912.

2 SHEETS—SHEET 1.

Inventor
Jackson M. Roe.

Witnesses
William Smith

By Victor J. Evans
Attorney

J. M. ROE.
ELECTRICALLY HEATED RECEPTACLE.
APPLICATION FILED JULY 17, 1912.
1,046,859.
Patented Dec. 10, 1912.
2 SHEETS—SHEET 2.
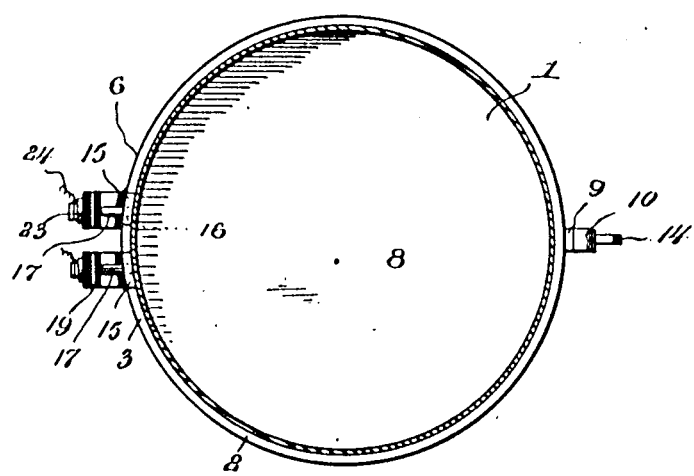
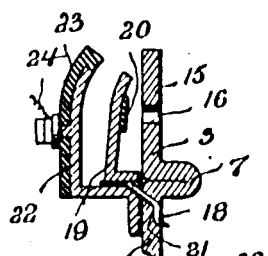
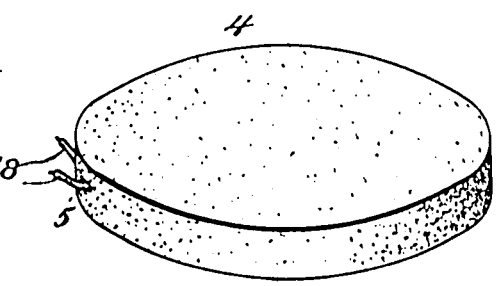
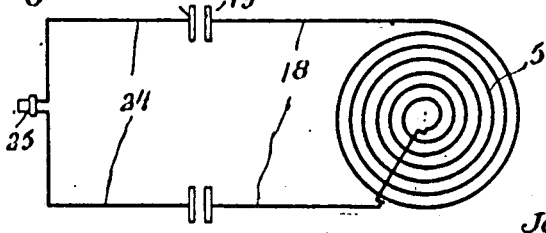
Witnesses
William Smith
James Koch
Inventor
Jackson M. Roe.
By Victor J. Evans
Attorney

UNITED STATES PATENT OFFICE.

JACKSON M. ROE, OF SUNNYSIDE, WASHINGTON, ASSIGNOR OF ONE-HALF TO CLAUDIUS NEWCOMB, OF SUNNYSIDE, WASHINGTON.

ELECTRICALLY-HEATED RECEPTACLE.

1,046,859.

Specification of Letters Patent.

Patented Dec. 10, 1912.

Application filed July 17, 1912. Serial No. 709,969.

*To all whom it may concern:*

Be it known that I, JACKSON M. ROE, a citizen of the United States, residing at Sunnyside, in the county of Yakima and State of Washington, have invented new and useful Improvements in Electrically-Heated Receptacles, of which the following is a specification.

This invention relates to electrically heated receptacles and has for an object to provide a portable apparatus which may be connected in any suitable electric circuit and operatively associated with a receptacle such as a coffee pot whereby the latter can be effectually heated with maximum efficiency and with the minimum expense.

Another object of the invention is to provide means whereby the receptacle can be readily connected with or disconnected from the heating element so as to obviate the necessity of lifting the latter when the receptacle is lifted and canted to discharge its contents.

Another object of the invention is to provide a device of this character which will be so constructed that when the receptacle is removed from the heating element the electric circuit will be opened and the circuit closed when the receptacle is operatively associated with said element.

Figure 1:
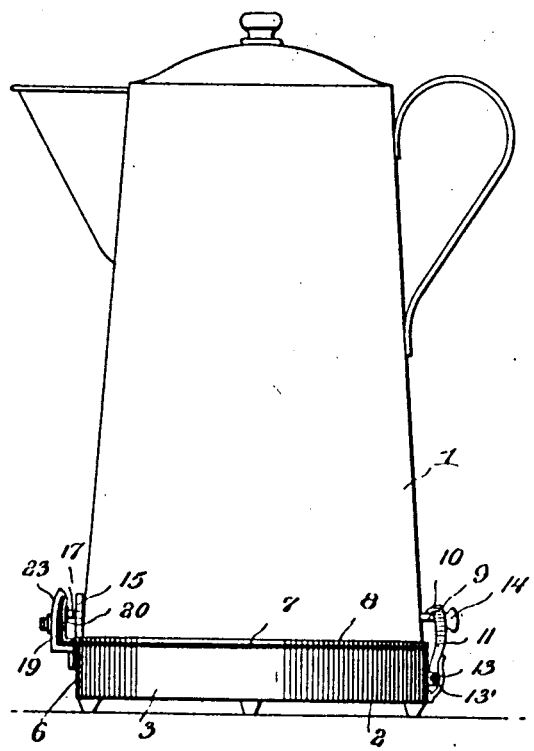
Figure 2:
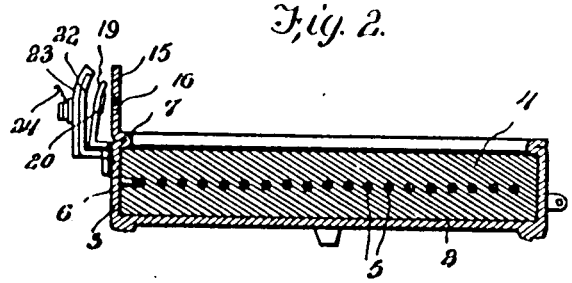

In the drawing forming a portion of this application and in which like letters of reference indicate similar parts in the several views:—Figure 1 is a side view of the receptacle. Fig. 2 is a vertical section therethrough. Fig. 3 is a vertical section through the heating element. Fig. 4 is a horizontal section on line 4—4 of Fig. 3. Fig. 5 is a perspective view of the heating element. Fig. 6 is a diagrammatic view, illustrating the electrical connections between the heating element and the circuit closer.

The device which is admirably adapted for use by travelers preferably includes a portable structure consisting of a vessel 1 and a heating element 2 therefor. The heating element comprises a shell 3 which has mounted therein a refractory body 4 in which is embedded a resisting wire 5 to which electricity may be conducted to thoroughly heat the body 4. The side walls 6 of the shell 3 are upset to form a retaining flange 7 which engages against a portion of the body 4 so as to securely hold the latter operatively associated with the shell.

The vessel 1 which as conventionally shown herein is in form of a coffee pot is provided with a flat bottom 8 which is superimposed with relation to the upper surface of the heat body 4 so that when the latter is heated the heat emanating therefrom will be applied directly to bottom of the vessel. At one side the vessel 1 carries a keeper 9 which is adapted to be engaged by the hook 10 of a latch 11. The latch is pivoted at 13 to one side of the shell 3, a spring 13 of the shell being engaged against the latch so as to hold the hook thereof operatively associated with the keeper 9 of the vessel. The latch 11 is provided with a manipulating portion 14 which may be engaged by the hand and manipulated so as to effect the release of the latch from the keeper. At the opposite side of the shell 3 and formed preferably on the walls 6 are vertical ears 15 which have horizontal passages 16 therein for the reception of lateral pins 17 upon the vessel 1 and near the lower end thereof.

The terminals 18 of the resisting wire 5 are secured to relatively weak contacts 19 which have insulating portions 20 that are disposed in the path of the pins 17. The terminals 18 of the resisting wire are extended through an insulating block 21 of the shell 3. This block has also mounted thereon fixed contacts 22 which are located in such proximity to the contacts 19 as to be engaged thereby under the force or action of the pins 17. The contacts 22 are provided with insulating portions 23 which are of a size sufficient to prevent the hand of the operator contacting with the metal portions of the contacts 19 and 22. The contacts 22 are connected by branch wires 24 with sockets 25 or equivalent devices that may be connected in any suitable manner. From the construction described it is evident that the means employed while being extremely simple and durable are effective to a rapid heating of the cooking vessel with a minimum expenditure of electricity. After the receptacle 1 has been heated to the desired degree the latch 11 of the shell 3 can be actuated to effect its release from the keeper 9 whereby the receptacle can be conveniently lifted or handled and canted without necessitating carrying the base or shell therewith. When placing the receptacle 1 in operative position upon the shell 3 the pin 17 should engage against the insulating portions 20 of the contacts 19. On predetermined movement or adjustment of the receptacle the said contact 19 will be made to engage the contacts 22. This connects the terminals 18 of the resisting wire 5 with the branches 24, the latter being connected in a main source of heat supply then causes the insulating heat element 4 to be thoroughly heated as described. When the vessel 1 is removed from the shell 3 the pins 17 will disengage the insulating portions 20 and under the inherent elasticity of the contacts 19 the latter will automatically disconnect themselves from the adjacent contacts 22. The electric circuit is now broken and no heat will be conducted to the element 4 as long as the companion contacts are disconnected.

I claim:—

An electrically heated element including a circuit closer having fixed contacts and movable contacts, a vessel movably supported upon the element, and means on the vessel whereby on one adjustment thereof on the element the movable contacts will be brought to bear against the said fixed contacts.

In testimony whereof I affix my signature in presence of two witnesses.

JACKSON M. ROE.

Witnesses:
CLAUDIA L. HAMBLY,
H. H. NEWCOMB.

---

Copies of this patent may be obtained for five cents each, by addressing the "Commissioner of Patents, Washington, D. C."